3,410,888
PROCESS FOR RECOVERING AROMATIC
DIISOCYANATES
Philip D. Hammond, North Haven, Conn., assignor to
The Upjohn Company, Kalamazoo, Mich., a corporation of Delaware
No Drawing. Filed May 18, 1965, Ser. No. 456,858
3 Claims. (Cl. 260—453)

This invention relates to a process for the preparation of isocyanates and is more particularly concerned with the isolation and purification of hydrocarbyl mono- and polyisocyanates obtained by phosgenation of the corresponding amines.

Isocyanates, particularly aliphatic, araliphatic and aromatic polyisocyanates are currently in demand as intermediates in chemical synthesis such as in the preparation of polyurethanes; see, for example, Saunders et al. Polyurethane Chemistry and Technology, part II, Interscience 1964. The isocyanates are normally prepared by phosgenation of the corresponding amines using procedures well known in the art; see, for example, Siefkin, Annalen 562, page 75, 1949. Normally, this phosgenation step is carried out in the presence of an inert solvent such as benzene, toluene, chlorobenzene, o-dichlorobenzene, and the like. In recovering the isocyanate from the reaction mixture obtained in the phosgenation the inert solvent is removed and the crude isocyanate is generally subjected to distillation in order to effect purification.

Hitherto, the distillation of the isocyanate has been accomplished using a batch procedure. In such distillation procedures the isocyanate distilland is subjected to prolonged heating with consequent degradation and significant loss of useful material. In addition the need to carry out this distillation on a batch basis has prevented the operation of a process for the preparation of isocyanates from the corresponding amines on a continuous basis. The advantages attendant upon the use of a continuous process will be obvious to one skilled in the art.

I have now found that, under the conditions to be described hereinafter, it is possible to use a continuous distillation procedure in place of a batch distillation in the aforesaid process. An improved yield of isocyanate is obtained thereby in addition to the advantages which are inherent in the use of a continuous process.

In its broadest aspect, the process of the present invention is an improved process for the recovery of isocyanates which process comprises subjecting the crude isocyanate, obtained by phosgenation of the corresponding amine, to distillation using a thin film still and recovering the desired isocyanate as volatile overhead.

Any of the thin film distillation units known in the art for the distillation of heat sensitive materials can be employed in the process of the invention. Such distillation units include climbing thin film stills, falling thin film stills, spinning disc film stills, horizontal and vertical wiped film stills and the like. Illustrative stills of the above types are those shown in U.S. Patents 2,890,155, 2,927,634, 2,993,842, 3,020,211 and 3,060,107.

In the above types of still the distillation feed is caused to flow as a thin film through a heating zone in which the rate of heat transfer is very high. The volatile component of the feed is removed as overhead and the undistilled portion of the feed is removed from a suitable point in the still, the overall residence time of the feed in the still being kept as short as possible.

In general, the process of the invention is carried out as follows. The crude solution of isocyanate in inert solvent, which has been obtained by phosgenation of the corresponding amine, is treated to remove the inert solvent. The inert solvent employed with any particular isocyanate is generally chosen so that its boiling point is lower than that of the isocyanate, the difference in boiling points being preferably at least 30° C. to facilitate ready separation of the two components. The separation can be effected using suitable evaporators such as climbing film evaporators, falling film evaporators, and the like units conventional in the art for solvent stripping. This step is readily adapted to continuous procedures, the solution of isocyanate in solvent being passed one or more times through a suitable solvent evaporator or series of evaporators maintained at about the boiling point of the inert solvent. This evaporation step can be carried out under reduced pressure, if desired.

Where the boiling points of the insert solvent and the isocyanate are not substantially different, e.g the difference is less than about 30° C. some isocyanate will be removed in this solvent stripping step. The mixture of solvent and isocyanate so removed can be added to the fresh isocyanate solvent feed entering the solvent evaporators, or it can be treated in separate evaporation or fractional distillation stages to concentrate the isocyanate and the concentrate returned to the solvent stripper feed.

The crude isocyanate remaining as the undistilled residue from the solvent stripping step is then subjected to distillation in a thin film still.

If desired the whole of the isocyanate obtained in the solvent stripping step can be subjected to distillation in said thin film still. In an alternative procedure, part of the isocyanate can be removed by distillation under conventional procedures in a separate distillation step and the residue from this step can be subjected to distillation in the thin film still. Whichever alternative is employed the distillation in the thin film still yields a volatile overhead representing the desired isocyanate which is condensed in suitable condensing equipment and taken to storage.

The alternative procedure mentioned above in which part of the isocyanate is removed by distillation in a preliminary step and the remainder is removed in a second step in the thin film still, offers advantages in particular applications. Thus, where the crude isocyanate is present as a mixture of isomers, for example, a mixture of 2,4- and 2,6-toluene diisocyanate, a mixture of 4,4'- and 2,4'-methylenebis(phenyl isocyanate), and the like, a change in isomer content of these mixtures can be obtained by using the above two step distillation. The distillate obtained in the first step will be richer in the more volatile isomer and the undistilled residue from the first step will be richer in the less volatile isomer. Accordingly, when the undistilled residue from the second step is subjected to distillation the distillate so obtained will be richer in the less volatile isomer than is the distillate obtained in the first step.

Further, by adjustment of the amounts of distillate taken as overhead in the first step it is possible to regulate the isomer content of distillate from the two stages to whatever extent is desired.

If desired, the two step distillation described above can be carried out in different types of distillation still. Advantageously, the two steps (or more steps, if desired) are carried out in the same type of still, and, in a particular embodiment, the two steps are carried out by passing the undistilled portion from the first step back through the self same still employed in the first step.

In a further alternative, the two step distillation described above can be effected by adjusting the conditions under which the solvent removal is conducted so that a portion of the isocyanate is removed with the solvent, from which it is subsequently recovered by reprocessing through the solvent recovery step. Such a process can be employed to effect concentration of less volatile isomer in the undistilled residue, as described above. Said process has the additional advantage that it serves to remove colored impurities in the crude isocyanates as well as traces of other impurities which may have been present in the amine starting material used in the phosgenation stage.

The above two step distillation represents a particular embodiment falling within the broad confines of the present invention and, although it is applicable to the recovery of any isocyanate, it is especially useful in the recovery of aromatic diisocyanates, particularly those which comprise a mixture of isomers, for the reasons set forth above. This particular embodiment of the process of the invention can be expressed as follows, illustratively in terms of recovery of an aromatic diisocyanate:

The process of the invention in this particular aspect represents a process for the recovery of an aromatic diisocyanate from a reaction mass residue comprising the steps of reacting an aromatic diamine with phosgene and distilling off a portion of the aromatic diisocyanate so produced, passing the remaining residue into a second distillation vessel in which the residue is distributed upon the inner surface of said vessel as a thin film, and the film is subjected to a temperature and vacuum sufficient to evaporate the aromatic diisocyanate, and removing as vapors from said vessel, a vapour substantially rich in aromatic diisocyanate. A specific embodiment of a process falling with the above is shown in Example 1, hereinafter. A further specific embodiment of a process falling within the above defined aspect of the invention is shown in the specification of U.S. Patent 3,140,305, the specification and drawings of which latter U.S. Patent are hereby incorporated specifically by reference in this present application.

The conditions of temperature and pressure employed in the thin film still in the process of the invention are adjusted so that the isocyanate is recovered as volatile overhead at any desired rate consistent with avoidance of excessive residence time of isocyanate in the still. Depending upon the capacity of the still and the feed rates employed it may be necessary to recover the isocyanate in two or more separate passes through the still or, alternatively, by returning the undistilled bottoms fraction from the first pass to the feed isocyanate for further processing. Preferably, the temperature and pressure conditions in the evaporator and the rate of feed to the evaporator are adjusted so that the total isocyanate content of the feed is recovered as volatile overhead and the undistilled residue contains no recoverable isocyanate. Unlike the residues normally obtained in the batch type distillation hitherto employed, the undistilled residue to be discarded in the present process is in a free flowing state and requires no harsh procedures, such as are necessary to remove the corresponding residue from batch distillation procedures.

While any of the thin film stills described above can be employed in the process of the invention, we have found that stills of the wiped film type, particularly those having tapered walls such as described in U.S. Patent 2,927,634, give especially advantageous results.

The process of the invention can be applied to the recovery of a wide variety of isocyanates including aliphatic, aromatic, and araliphatic mono- and polyisocyanates. Representative isocyanates are aromatic isocyanates such as 2,4-toluene diisocyanate, 2,6-toluene diisocyanate, and mixtures of these isomers, 4,4'-methylenebis(phenyl isocyanate), 2,4'-methylenebis(phenyl isocyanate) and mixtures of these isomers, 1,5-naphthalene diisocyanate, phenyl isocyanate, p-chlorophenyl isocyanate, dianisidine diisocyanate (3,3'-dimethoxy-4,4'-diisocyanatodiphenyl), bis-o-tolidine diisocyanate, tri(4-isocyanatophenyl)methane, and the like; aliphatic isocyanates such as hexamethylene diisocyanate, octadecyl isocyanate, and the like; and araliphatic isocyanates such as m-xylylene-$\alpha,\alpha'$-diisocyanate, 1,4-diethylbenzene-$\beta,\beta'$-diisocyanate, 1,5-diethylnaphthalene-$\beta,\beta'$-diisocyanate and the like.

The following examples describe the manner and process of making and using the invention and set forth the best mode contemplated by the inventor of carrying out the invention but are not to be construed as limiting.

EXAMPLE 1

A solution containing approximately 10% w./w. of o-tolidine diisocyanate (TODI; 4,4'-diisocyanato-3,3'-dimethyldiphenyl) in o-dichlorobenzene was prepared using the following procedure.

A solution of 600 parts by weight of o-tolidine (3,3'-dimethylbenzidine) in 7500 parts by weight of o-dichlorobenzene was stirred and heated to a temperature of 65 to 75° C. A total of 220 parts by weight of anhydrous hydrogen chloride was added to the stirred mixture over a period of 6 hours. The temperature of the reaction mixture rose to 100° C. during the addition of the hydrogen chloride. When the addition was complete the resulting mixture was subjected to partial distillation at 140 to 145° C. under a pressure of 16–18 inches of mercury to remove water azeotropically, the distillation being continued until no further water was collected in the condenser and the o-dichlorobenzene collected in the condenser was clear. The resulting dry solution of o-tolidine dihydrochloride so obtained was then heated under reflux condenser with stirring at 145 to 150° C. and a total of 644 parts by weight of phosgene was passed into the solution at a rate of approximately 80 parts by weight per hour. When the addition of phosgene was complete the reaction mixture was purged with nitrogen while stirring and maintaining the temperature at 145 to 150° C. The resulting solution of TODI in o-dichlorobenzene was then filtered.

The TODI solution so obtained was subjected to solvent-stripping followed by distillation in a wiped film vacuum still using the following procedure.

The solvent-stripper employed was a combination evaporator-stripper manufactured by Artisan Metal Products Inc. of Waltham, Mass. In this apparatus the solution to be stripped was fed through a heat exchanger (heat supplied by super-heated steam) and the resulting heated mixture was flash-injected tangentially into an evaporating chamber. The volatile fraction rose and, after passing through a built-in entrainment separator, passed out of the evaporator to a condenser. The unvolatilized fraction collected in the bottom of the evaporator chamber and was permitted to over flow into a stripping column. Said fraction passed downwardly through this column (with steam heated jacket to maintain the desired temperature) wherein it was scrubbed and stripped by ascending volatile phase. The non-volatilized fraction (bottoms fraction) was removed from the bottom of the column.

The evaporator-stripper system was operated under vacuum of the order of 2 mm. of mercury. The following Table I shows the operating conditions in the stripper system at zero time (beginning of feed) and at various times throughout the operation.

The various temperatures recorded are those of—"feed": feed entering evaporator from pre-heating zone; "bottoms": undistilled bottoms fraction leaving base of fractionating column; "overhead": vapour taken off overhead to condenser.

The various pressures recorded are those of—"body": section immediately over the top of fractionating column; "condenser": body of condensing zone; "pump": gauge on vacuum pump.

The values for percent isocyante were obtained from aliquots of the various fractions and were determined using the method described in ASTM D1638–60T.

TABLE I

| | Time (mins.) | | | | |
|---|---|---|---|---|---|
| | 0 | 55 | 100 | 185 | 215 |
| Feed rate (lbs./hr.) | 28 | 22 | (¹) | 14 | 40 |
| Percent of feed taken as volatile overhead | | 93 | (¹) | 92 | 89 |
| Temperature (° F.): | | | | | |
| Feed | 285 | 293 | 290 | 292 | 262 |
| Bottoms | 350 | 320 | 365 | 330 | 300 |
| Overhead | 165 | 165 | 163 | 163 | 172 |
| Pressure (mm. of Hg): | | | | | |
| Body | 3.5 | 1.5 | 2.25 | 2.5 | 4.8 |
| Condenser | 2.0 | 1.5 | 2.0 | 2.0 | 2.3 |
| Pump | 1.5 | 1.0 | | 1.8 | |
| Isocyanate content, percent isocyanate (TODI) in bottoms | | 94.1 | | 94.6 | 92.3 |
| Percent isocyanate in solvent overhead | | 2.62 | | 2.6 | 0.85 |
| Percent total starting isocyanate in overhead | | | 27 | | 24.3 | 6.8 |

¹ Feed gauge temporarily out of action.

A second batch of approximately 10% w./w. solution of o-tolidine diisocyanate in o-dichlorobenzene was subjected to solvent stripping using the above procedure. The crude isocyanate (bottoms fraction) obtained from the above two batches was combined. The combined crude isocyanate batches so obtained were subjected to vacuum distillation in a horizontally mounted, tapered, wiped film still constructed as described in U.S. Patent 2,927,634, having a total internal heat transfer area of 1 sq. ft.

The following Table II shows the operating conditions in said wiped film still at the steady state first reached 5.4 minutes after feed was started, and at times throughout the operation.

The still was shut down shortly after the readings in the second column were taken; distillation was begun again at a later time and the readings in the third column were taken when the distillation had again reached a steady state (7.4 min. after restarting).

The various temperatures recorded are—"feed": feed at point of entry to still (after preheating); "bottoms": undistilled bottoms fraction at exit from still; "overhead": vapour taken off overhead to condenser.

The volatile overhead removed from the still and collected in the condenser zone in the above operation was found to be o-tolidine diisocyanate (TODI) having a melting point of 71 to 72° C.

The prolonged degassing and consequent difficulty in maintaining vacuum normally encountered at the outset of a batch distillation of crude TODI was not observed in the above distillation in the wiped film still. This represents a further advantage in the present process compared with batch procedures hitherto employed.

TABLE II

| | Time (mins.) | | |
|---|---|---|---|
| | 1st steady state | 20 min. later | 2d steady state |
| Feed rate, lbs./hr | 26 | 26 | 18.6 |
| Percent feed taken as volatile overhead (TODI) | 85.3 | | 77 |
| Temperature (° F.): | | | |
| Feed | 326 | 325 | 324 |
| Bottoms | 434 | 427 | 385 |
| Overhead | | | 300 |
| Pressure in system (mm. of Hg) | 2.6 | 4-8 | 2.5 |
| Hot oil feed to still jacket (° F.) | 533 | 528 | 480 |
| Still rotor speed (r.p.m.) | 1,790 | | 2,000 |

EXAMPLE 2

A solution containing approximately 10% w./w. of dianisidine diisocyanate (DADI: 3,3'-dimethoxy-4,4'-diisocyanatodiphenyl) in o-dichlorobenzene, prepared by phosgenation of a solution of the corresponding amine (3,3'-dimethoxybenzidine) dihydrochloride in o-dichlorobenzene, was subjected to solvent-stripping followed by distillation in a wiped film vacuum still using the following procedure.

The solvent-stripper employed was that described in Example 1. The following list shows the operating conditions in the stripper system at a steady state achieved 5.2 minutes after start of the stripping and representative of the conditions employed throughout the run; the recorded temperatures and other data quoted have the same significance as in Example 1:

Feed rate (lbs./hr.) _____ 200
Percent feed taken off as volatile overhead _____ 33
Temperature (° F.):
    Feed _____ 192
    Bottoms _____ 300
    Overhead _____ 182

The crude DADI collected as bottoms fraction from the above solvent stripping stage was employed as feed to the wiped film vacuum still employed in Example 1 above. The operating conditions employed in said still are shown in Table III, the recorded temperatures and other data quoted having the same significance as in Example 1.

TABLE III

| | Time (mins.) | | | |
|---|---|---|---|---|
| | 0 (first steady state) | 20 | 65 | 120 |
| Feed rate (lbs./hr.) | 28 | 29 | 28 | 34.6 |
| Percent feed recovered as volatile overhead | 79 | 80 | 75 | 83 |
| Temperature (° F.): | | | | |
| Feed | 331 | 330 | 330 | 332 |
| Bottoms | 346 | 371 | 385 | 458 |
| Overhead | 345-360 | 383 | 404 | 445 |
| System pressure (microns) | 500 | 700 | 1,000 | 3,600 |
| Temp. of hot oil to still jacket | 453 | 455 | 459 | 497 |
| Still rotor speed (r.p.m.) | 2,030 | 2,050 | 2,050 | 2,080 |

The volatile overhead removed from the still and collected in the condenser zone in the above operation was found to be dianisidine diisocyanate (DADI) having a melting point of 122° C.

EXAMPLE 3

A solution containing approximately 10% w./w. of octadecyl isocyanate in o-dichlorobenzene, prepared by phosgenation of a solution of octadecylamine hydrochloride in o-dichlorobenzene, was subjected to solvent-stripping followed by distillation in a wiped film vacuum still using the following procedure.

The solvent stripper employed was that described in Example 1. Table IV shows the operating conditions employed in the stripper system beginning at the first steady state (zero time). The temperature and other data recorded in said table have the same significance as in Example 1.

TABLE IV

| | Time (mins.) | | | |
|---|---|---|---|---|
| | 0 | 35 | 85 | 160 |
| Feed rate (lbs./hr.) | 40.5 | 116 | 118 | 109 |
| Percent feed taken as volatile overhead | 86.3 | 82.3 | 81.2 | 81.1 |
| Temperature (° F.): | | | | |
| Feed | 208 | 158 | 159 | 188 |
| Bottoms | 302 | 258 | 260 | 262 |
| Overhead | 324 | 317 | 317 | 313 |
| Pressure (mm. of Hg): | | | | |
| Body | 12.0 | 15.0 | 15.0 | 20 |
| Condenser | 11.5 | 12.0 | 12.0 | 21 |
| Pump | 11.4 | 11.5 | 11.4 | 11.5 |

A second batch of approximately 10% w./w. solution of octadecyl isocyanate in o-dichlorobenzene, prepared by phosgenation of a solution of octadecylamine hydrochloride in o-dichlorobenzene, was subjected to solvent-stripping using the above procedure.

The bottoms fractions from each of the above stripping procedures were combined and employed as feed to the wiped film vacuum still employed in Example 1 above. The operating conditions employed in said still are shown in Table V, the recorded temperatures and other data quoted having the same significance as in Example 1.

TABLE V

| | Time (mins.) | | | |
|---|---|---|---|---|
| | 0 (first steady state) | 30 | 65 | 100 |
| Feed rate (lbs./hr.) | 17 | 13 | 13.7 | 7.5 |
| Percent feed recovered as volatile overhead | 95.8 | 97.0 | 89.6 | 93.0 |
| Temperature (° F.): | | | | |
| Feed | 319 | 316 | 318 | 317 |
| Bottoms | 411 | 423 | 417 | 400 |
| Overhead | 320 | 322 | 326 | 304 |
| System pressure (mm. of Hg) | 2.15 | 2.05 | 2.07 | 2.0 |
| Temp. of hot oil (° F.) to still jacket | 491 | 486 | 452 | 420 |
| Still rotor speed (r.p.m.) | 2,000 | 2,000 | 2,000 | 2,000 |
| Percent octadecyl isocyanate in condensate from overhead | 94 | 95.5 | 95 | 97 |

I claim:

1. A process for the recovery of an aromatic diisocyanate from a reaction mass residue wherein said diisocyanate contains two phenyl nuclei and the isocyanate groups are attached to nuclear carbon atoms in different phenyl nuclei, said process comprising the steps of:

(1) reacting the corresponding aromatic diamine with phosgene and distilling off a portion of the aromatic diisocyanate so produced, (2) passing the remaining residue into a second distillation vessel in which (a) the residue is distributed upon the inner surface of said vessel as a thin film, and (b) the film is subjected to a temperature and vacuum sufficient to evaporate the aromatic diisocyanate, and (3) removing as vapors from said vessel, a vapor substantially rich in aromatic diisocyanate.

2. The process of claim 1 wherein the aromatic diisocyanate is o-tolidine diisocyanate.

3. The process of claim 1 wherein the portion of aromatic diisocyanate distilled in step (1) is removed simultaneously with removal of inert solvent at the completion of the phosgenation step.

No references cited.

CHARLES B. PARKER, *Primary Examiner.*

D. H. TORRENCE, *Assistant Examiner.*